(12) United States Patent
Hultine et al.

(10) Patent No.: US 12,178,151 B2
(45) Date of Patent: Dec. 31, 2024

(54) FERTILIZER FROM HYDROLYZED CYANAMIDE COMPOUNDS

(71) Applicant: THG, LLC, Milwaukie, OR (US)

(72) Inventors: J. Dustin Hultine, Milwaukie, OR (US); Robert Kurt Graupner, Hillsboro, OR (US)

(73) Assignee: THG, LLC, Milwaukie, OR (US)

( * ) Notice: Subject to any disclaimer, the term of this patent is extended or adjusted under 35 U.S.C. 154(b) by 0 days.

(21) Appl. No.: 18/449,175

(22) Filed: Aug. 14, 2023

(65) Prior Publication Data

US 2024/0065141 A1    Feb. 29, 2024

Related U.S. Application Data

(60) Provisional application No. 63/373,835, filed on Aug. 29, 2022.

(51) Int. Cl.
*A01C 23/02* (2006.01)
*C05C 7/00* (2006.01)
*C05C 11/00* (2006.01)

(52) U.S. Cl.
CPC .............. *A01C 23/027* (2013.01); *C05C 7/00* (2013.01); *C05C 11/00* (2013.01)

(58) Field of Classification Search
CPC ....... A01C 23/027; A01C 23/02; A01C 23/00; C05C 7/00; C05C 11/00
See application file for complete search history.

(56) References Cited

U.S. PATENT DOCUMENTS

| | | |
|---|---|---|
| 2002/0121117 A1 | 9/2002 | Hartmann et al. |
| 2008/0227746 A1 | 9/2008 | Boss et al. |
| 2020/0325021 A1 | 10/2020 | Hultine et al. |

FOREIGN PATENT DOCUMENTS

| | | |
|---|---|---|
| DE | 19707692 A1 | 8/1998 |
| WO | 2012123378 A1 | 9/2012 |
| WO | 2012123380 A2 | 9/2012 |

OTHER PUBLICATIONS

"Production of urea worldwide in 2021, by region," Statista Website, Available Online at www.statista.com/statistics/1287037/global-urea-production-by-region/, Jan. 2023, 2 pages.
Schwenke, G., "Nitrogen Volatilisation: Factors Affecting How Much N Is Lost And How Much Is Left Over Time," Grains Research & Development Corporation Website, Available Online at https://grdc.com.au/resources-and-publications/grdc-update-papers/tab-content/grdc-update-papers/2014/07/factors-affecting-how-much-n-is-lost-and-how-much-is-left-over-time, Jul. 25, 2014, 8 pages.
Jones, C. et al., "Factors Affecting Nitrogen Fertilizer Volatilization," Montana State University, Available Online at https://landresources.montana.edu/soilfertility/documents/PDF/pub/Urea%20vol%20factors%20BMP%20combo.pdf, Feb. 2013, 16 pages.

(Continued)

*Primary Examiner* — Christopher J. Novosad
(74) *Attorney, Agent, or Firm* — Alleman Hall & Tuttle LLP

(57) ABSTRACT

A fertilizer-application method comprises (a) receiving an aqueous solution of a cyanamide compound into a heated segment of a hydrolyzer; (b) allowing the cyanamide compound to hydrolyze in the heated segment, thereby forming an aqueous cyanamide hydrolysate (ACH); (c) allowing the ACH to cool under pressure; and (d) applying the ACH, after cooling, to soil.

10 Claims, 7 Drawing Sheets

(56) References Cited

OTHER PUBLICATIONS

"Ammonia: zero-carbon fertiliser, fuel and energy store," The Royal Society, Available Online at https://royalsociety.org/-/media/policy/projects/green-ammonia/green-ammonia-policy-briefing.pdf, Feb. 2020, 40 pages.

"Noble Rancher Articles: Regenerative Agriculture category," Noble Research Institute, Available Online at www.noble.org/category/regenerative-agriculture/, Retrieved on Sep. 25, 2023, 8 pages.

"Fertilizer Urea," University of Minnesota Extension, Available Online at https://extension.umn.edu/nitrogen/fertilizer-urea, 2021, 10 pages.

CF Industries, "Urea Ammonium Nitrate Solution—28%, 30%, 32% N (UAN)," Version 2.0, www.cfindustries.com, Sep. 28, 2018, 8 pages.

CF Industries, "Urea Ammonium Nitrate (UAN) with Sulfur," Version 1.1, www.cfindustries.com, Sep. 1, 2015, 8 pages.

Belsky, A. et al., "Reactions of cyanamide, dicyandiamide and related cyclic azines in high temperature water," The Journal of Supercritical Fluids, vol. 10, No. 3, Aug. 1, 1997, 8 pages.

Wetchakun, N. et al., "Influence of calcination temperature on anatase to rutile phase transformation in TiO2 nanoparticles synthesized by the modified sol-gel method," Materials Letters, vol. 82, May 29, 2012, 4 pages.

Lundström, A. et al., "Urea decomposition and HNCO hydrolysis studied over titanium dioxide, Fe-Beta and γ-Alumina," Applied Catalysis B: Environmental, vol. 106, No. 3-4, May 17, 2011, 7 pages.

Gilbert, M., "Mechanism and kinetics of the dicyandiamide cure of epoxy resins," Doctor of Philosophy Dissertation, University of Massachusetts Polymer Science and Engineering Department, May 1988, 269 pages.

Phelps, T. et al., "Water Treatment and Separation Science," Oak Ridge National Laboratory's Environmental Sciences Division, Available Online at www.esd.ornl.gov/research/earth_sciences/water_treatment.shtml, Aug. 8, 2005, 3 pages.

"Borla Performance Industries developing muffler/membrane unit for exhaust water extraction with ORNL nanopore membrane technology," Green Car Congress, Available Online at www.greencarcongress.com/2012/01/borla-20120131.html, Jan. 31, 2012, 10 pages.

"1-Cyanoguanidine," ChemBK, Available Online at www.chembk.com/en/chem/1-Cyanoguanidine, Jun. 17, 2023, 17 pages.

Johnson, T. et al., "Experimental Evaluation of the Free Piston Engine—Linear Alternator (FPLA)," Sandia National Laboratories, Mar. 2015, 120 pages.

Flexible-fuel vehicles in Brazil, Wikipedia Website, Available Online at en.wikipedia.org/wiki/Flexible-fuel_vehicles_in_Brazil, Website Available as Early as Oct. 17, 2010, 15 pages.

Carbamate, Wikipedia Website, Available Online at en.wikipedia.org/wiki/Carbamate, Website Available as Early as May 19, 2004, 10 pages.

"Understanding the Impact DCD Concentration has on Nitrification," Koch Agronomic Services, Available Online at kochagronomicservices.com/can/knowledge-center/Understanding-the-Impact-DCD-Concentration-has-on-Nitrification_2295.aspx, Retrieved on Oct. 14, 2023, 6 pages.

ISA United States Patent and Trademark Office, International Search Report and Written Opinion Issued in Application No. PCT/US2023/072249, Feb. 15, 2024, WIPO, 14 pages.

FERTILIZER FROM HYDROLYZED CYANAMIDE COMPOUNDS

CROSS REFERENCE TO RELATED APPLICATIONS

This application claims priority to U.S. Provisional Patent Application Ser. No. 63/373,835, filed 29 Aug. 2022, the entirety of which is hereby incorporated herein by reference for all purposes.

TECHNICAL FIELD

This disclosure relates generally to the field of chemical engineering for agriculture, and more specifically to fertilizer technology based on point-of-use hydrolysis of one or more cyanamide compounds.

BRIEF DESCRIPTION OF THE DRAWINGS

The disclosure will be better understood from reading the following Detailed Description with reference to the attached drawing figures, wherein.

DETAILED DESCRIPTION

Figure 1:
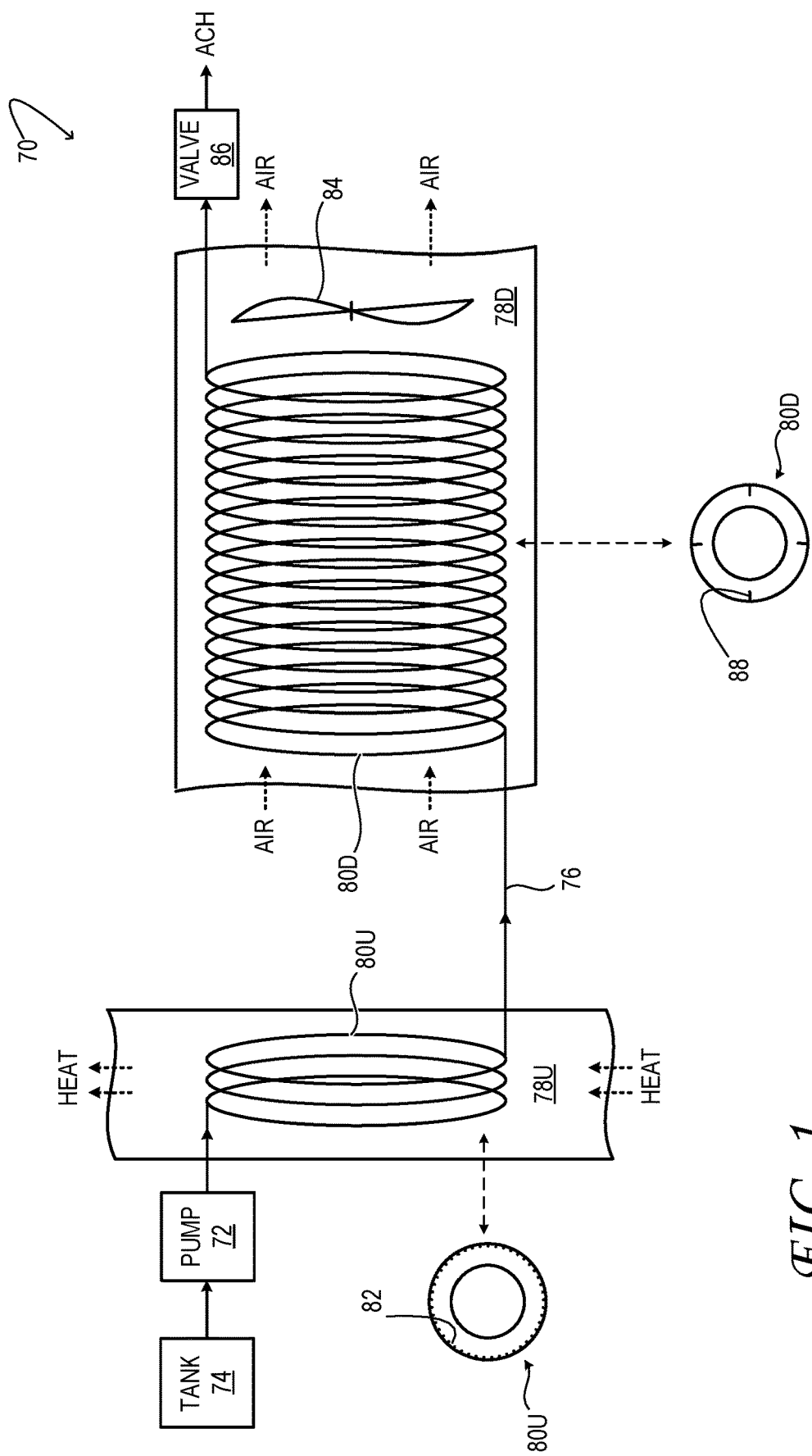
FIG. 1 shows aspects of an example hydrolyzer for converting one or more cyanamide compounds into an ammonium carbamate hydrolysate (ACH).

Plants require fixed nitrogen, which is absorbed through the roots. For that reason many agricultural fertilizers are formulated to supply fixed nitrogen. Anhydrous ammonia (NH 3), comprising 82% fixed nitrogen, is a commonly used fertilizer. Anhydrous ammonia is not a convenient product to handle on a farm, however. Anhydrous ammonia is a liquified gas, toxic and corrosive, which must be stored and transported under pressure. Distribution of anhydrous ammonia typically requires, accordingly, a network of pipelines and/or pressurized tank cars. Furthermore, the physicochemical transfer of fixed nitrogen from anhydrous ammonia to soil relies on a biphasic reaction between the ammonia gas and solid or liquid soil constituents,

$$NH_{3(g)} + H^+_{(s \text{ or } l)} \Longrightarrow NH_4^+_{(s \text{ or } aq)}. \tag{1}$$

Even when bladed deeply into the soil, a significant fraction of the anhydrous ammonia applied to the soil is lost to the atmosphere before it can react. Finally, anhydrous ammonia is an expensive commodity chemical, made from purified nitrogen and hydrogen via the Haber process,

$$N_{2(g)} + 3\,H_{2(g)} \rightarrow 2\,NH_{3(g)}. \tag{2}$$

In view of the issues noted above, this disclosure provides an alternative fertilizer solution for increasing the content of fixed nitrogen in soil. This disclosure also provides methods for making the fertilizer and for applying the fertilizer to soil.

The fertilizer herein can be derived from any suitable cyanamide compound, such as cyanamide itself, its dimer 2-cyanoganadine (2-CG), melamine, or any suitable mixture thereof. Under appropriate conditions, cyanamide compounds undergo hydrolysis, forming equilibrium mixtures comprising ammonium carbamate. Illustrating for 2-CG,

$$(NH_2)_2(CN)_2 + 4H_2O \rightarrow 2NH_4^+ + 2H_2NCO_2^-. \tag{3}$$

The term 'comprising' is used above because the actual speciation of aqueous ammonium carbamate is complex and condition-dependent, the carbamate anion readily hydrolyzing into ammonia, bicarbonate and carbonate,

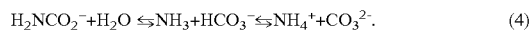

$$H_2NCO_2^- + H_2O \leftrightharpoons NH_3 + HCO_3^- \leftrightharpoons NH_4^+ + CO_3^{2-}. \tag{4}$$

The term 'aqueous cyanamide hydrolysate' (ACH) refers herein to an aqueous solution or slurry which is the hydrolysis product of one or more cyanamide compounds. ACH is the spreadable form of the fertilizer herein. When the ACH is applied to soil, at least some of its fixed nitrogen content is available immediately, for aqueous ammonium cations (from Eqs 3 and 4) freely exchange into the soil. Additional fixed nitrogen becomes available as NH 3 outgasses from the ACH, based on Eq 4 and on the thermal decomposition of ammonium bicarbonate, ammonium carbonate,

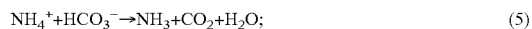

$$NH_4^+ + HCO_3^- \rightarrow NH_3 + CO_2 + H_2O; \tag{5}$$

ammonium carbamate,

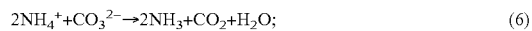

$$2NH_4^+ + CO_3^{2-} \rightarrow 2NH_3 + CO_2 + H_2O; \tag{6}$$

and ammonium carbamate,

$$NH_4^+ + H_2NCO_2^- \rightarrow 2NH_3 + CO_2. \tag{7}$$

Finally, at least some of the fixed nitrogen content of the ACH may dwell in the soil in the form of $NH_4^+$ and $H_2NCO^{2-}$ anions, until released thermally via Eqs 4-7. Overall a very high efficiency of physicochemical transfer of the fixed nitrogen content to the soil is expected.

In some examples the one or more cyanamide compounds may be hydrolyzed using heat generated by mobile farm equipment. In more particular examples such heat may comprise engine heat, recovered exhaust heat, or heat from an electrical heater (e.g., powered by a generator that derives heat from an engine or battery). In some, non-limiting examples hydrolysis (e.g., Eq 3) is enacted at a temperature or range of temperatures between 100 and 300 degrees Celsius. Hydrolysis temperatures greater than 300 degrees may also be used. In some examples hydrolysis may be accelerated via a suitable catalyst, and lower temperatures may be used. In one non-limiting example, a vanadium pentoxide/zinc catalyst may be used to accelerate the hydrolysis. Catalysts of other compositions are also envisaged.

FIG. 1 shows aspects of an example hydrolyzer 70 configured to hydrolyze one or more cyanamide compounds into an ACH suitable for application onto (or into) soil. In the illustrated example the one or more cyanamide compounds comprise a concentrated aqueous solution of 2-CG. Pump 72 draws the one or more cyanamide compounds from tank 74 and into coil 76. In alternative examples the tank contents may be drawn out by siphoning or by gravity, in lieu of pumping.

Upstream heat exchanger 78U maintains upstream segment 80U of coil 76 (and the fluid therein) at an elevated temperature, promoting hydrolysis as in Eq 3. In some examples upstream segment 80U includes a catalyst 82 arranged on the interior surface of segment 80U. In more particular examples the catalyst comprises vanadium pentoxide/zinc, but other catalysts may be used alternatively. The heat exchanger may be a gas-liquid heat exchanger configured to extract heat from engine exhaust or a liquid-liquid heat exchanger configured to extract heat from engine coolant. In some examples electrical heating may be used in lieu of a heat exchanger.

Downstream segment 80D of coil 76 is arranged fluidically downstream of upstream segment 80U. In some examples downstream heat exchanger 78D maintains downstream segment 80D (and the fluid therein) at an ambient temperature. In other examples the downstream heat exchanger cools the downstream segment to temperatures somewhat greater than ambient—e.g., 38 degrees Celsius. Generally speaking, the cooling may be such as to ensure that application of the ACH to the soil damages neither seed nor crop, in scenarios in which the soil supports seed or crop. In some examples the downstream heat exchanger may be an air-liquid heat exchanger, where a fan carries away the excess heat. Thus, in the illustrated example the downstream heat exchanger comprises a fan 84. Downstream segment 80D is long enough, and the pumping rate is low enough, to ensure that Eq 4, as well as the dissolution of $NH_3$ and $CO_2$, have reached equilibrium before the ACH passes through exit valve 86. In some examples downstream segment 80D includes a plurality of flow barriers 88 arranged on the interior of the segment, to accelerate equilibration of the ACH. In some examples, exit valve 86 is configured to maintain a positive pressure within coil 76. In some examples the desired pressure is within the range of 50 to 150 bar. In other examples the desired pressure is within the range of 10 to 50 bar. In other examples the pressure may be within the range of 2 to 10 bar. In still other examples the desired pressure may be within a higher, lower, broader, or narrower range. In some examples the exit valve may be a solenoid-controlled valve actuated under closed-loop control, based on input from a pressure and/or temperature sensor (not shown in the drawings).

In the illustrated example upstream segment 80U and downstream segment 80D are segments of 76, but that aspect is not strictly necessary, as non-coiled hydrolyzer configurations are also envisaged.

Figure 2:
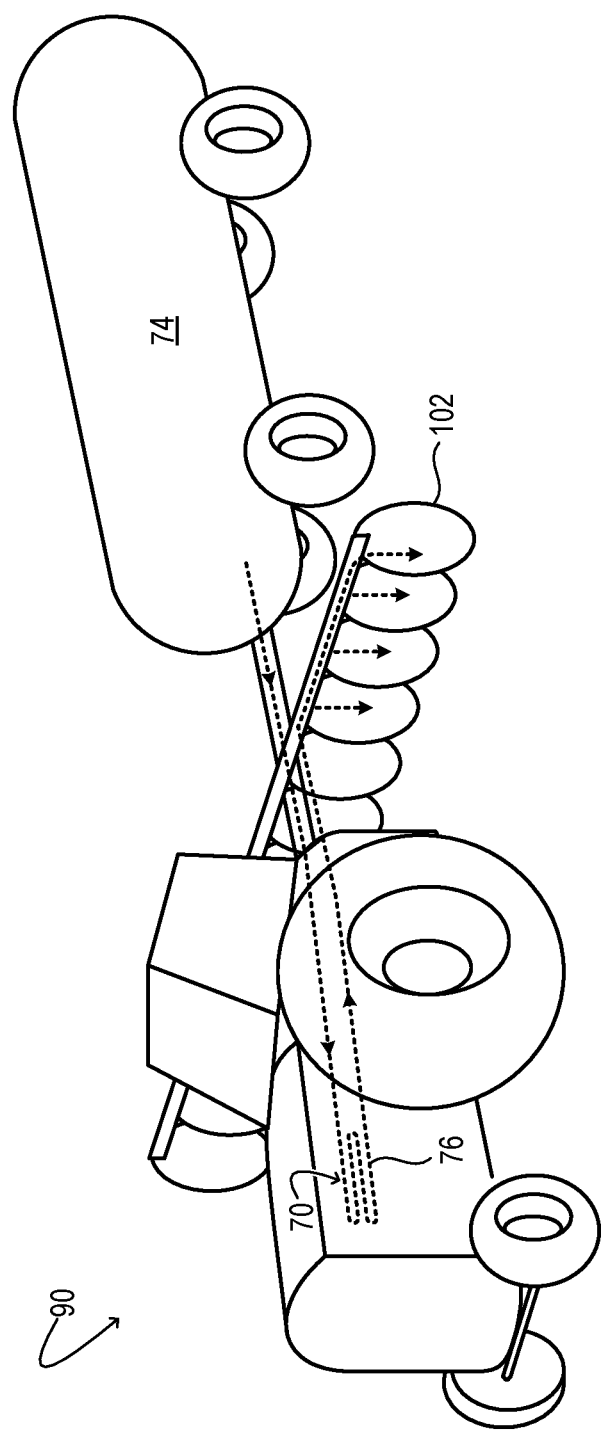
FIG. 2 shows aspects of mobile farm equipment comprising a hydrolyzer for converting one or more cyanamide compounds into an ACH.

As shown in FIG. 2, hydrolyzer 70 may be arranged in mobile farm equipment 90, wherein the ACH may be conducted to blades 92 or otherwise spread onto (or into) the soil. In some examples activities such as tilling and plowing may be enacted together with application of the ACH—i.e., concurrently in the same pass over the soil. In some examples the heat used for the hydrolysis may be drawn from the farm equipment—e.g., from the engine exhaust. In addition, at least some of the water used for the hydrolysis may be derived from the engine exhaust. Nanopore processing, for instance, may be used to purify the water for that purpose. In some examples, the placement of the fertilizer via the farm equipment may be guided by global positioning-system (GPS) technology. In some examples, high-pressure pumping of GPS guided 'shots' of ACH into the soil, followed by light compression and/or light tillage over the injected cone, would eliminate the need for continuous cones, thereby allowing a more efficient fertilizer application. In this way, in-field fertilizer applicator systems and power cost of pulling heavy applicators requiring significant steel bracing in supporting blade knives, and the cost of replacement blades through different soil types, would also be greatly reduced. Despite the many advantages of using mobile farm equipment to enact the hydrolysis and to dispense the ACH fertilizer solutions, stationary farm equipment may also be used. In those examples, exhaust heat from standing engines (e.g., irrigation engines) may be used to promote hydrolysis of 2-CG to ACH. For instance, a farmer's cooperative might use a standing engine to process cyanamides, such as 2-CG, for final product ACH tank delivery to farmers, where applications of ACH bypass the need for in-field processing.

Figure 3:
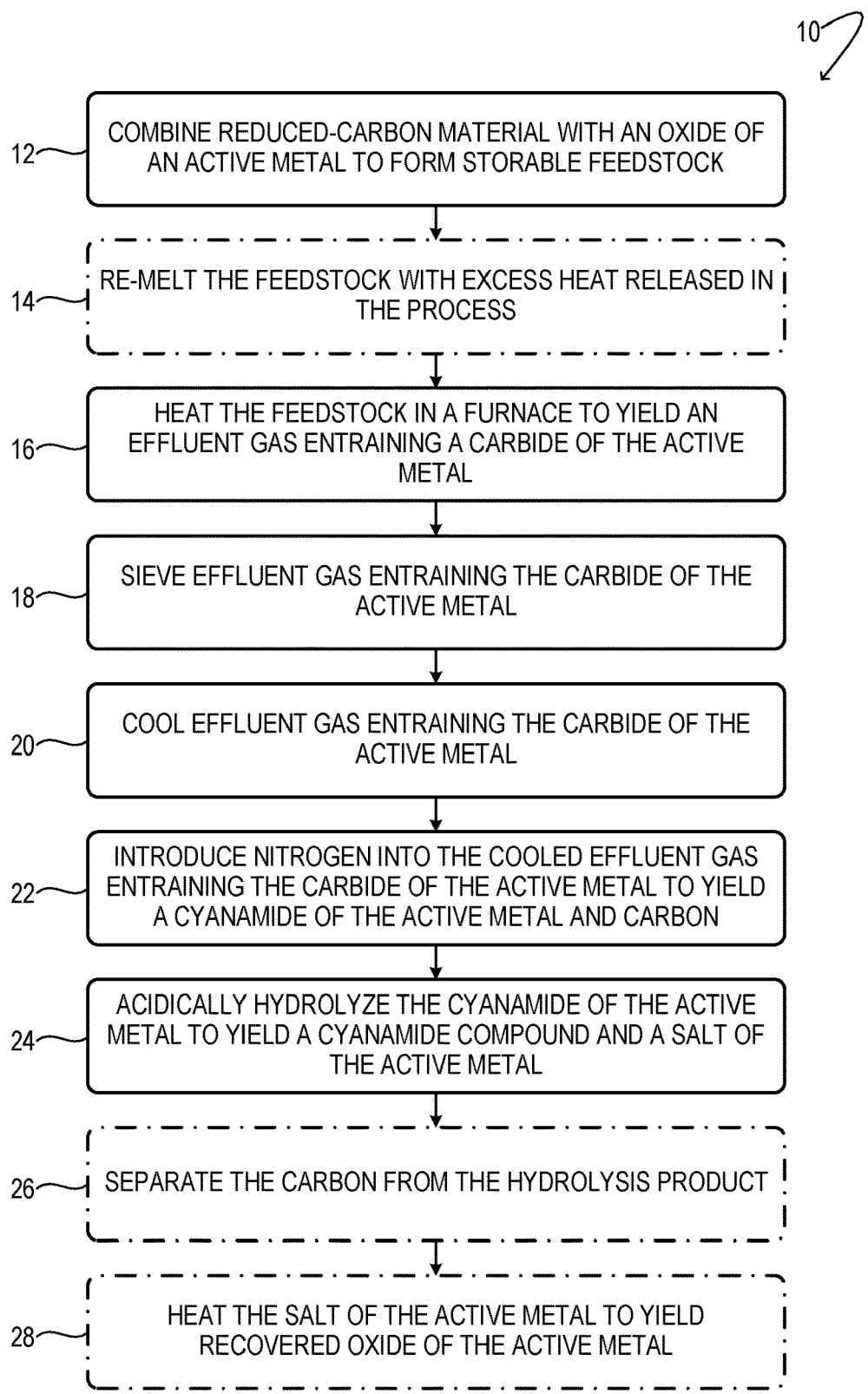
FIG. 3 shows aspects of an example process to make a cyanamide compound.

FIG. 3 shows aspects of an example process 10 for making one or more cyanamide compounds.

At 12 of process 10, reduced-carbon material is combined with an oxide of an active metal to form a storable feedstock for high-temperature processing. As used herein, a 'reduced-carbon material' is any material comprising carbon in an oxidation state less than or equal to zero. The skilled reader is reminded that the oxidation-state formalism assigns an oxidation state of +1 to hydrogen when bonded to a more electronegative atom, assigns an oxidation state of −2 to oxygen when bonded to a less electronegative atom, and assigns an oxidation state of zero to every atom in an elemental state. Accordingly, carbohydrates and elemental carbon both qualify as reduced-carbon material because the carbon therein has an oxidation state of zero. Non-limiting examples of reduced-carbon material include coke, coal, and charable organic material such as biomass, waste plastic, roof shingle, and motor-vehicle tires. In examples in which the reduced-carbon material comprises biomass, the biomass may include plant and animal products of all kinds, including waste products. One form of charable organic material of particular interest, due to its great abundance and high content of hydrogen, is lignin derived from the paper industry.

In some examples, hydrocarbon gas may be a source of the reduced-carbon material, at least in part. For instance, hydrocarbon gas may be processed under controlled conditions to yield carbon monoxide, and the carbon monoxide may be disproportionated downstream of the oxidation to yield elemental carbon via the Boudouard reaction, $$2CO \rightarrow C + CO_2. \tag{8}$$

Suitable conditions for forming carbon monoxide from hydrocarbon gas include steam reforming and/or aerobic oxidation. In these and other examples, the Bosch reaction may be used to provide elemental carbon from $CO_2$, using hydrogen as a reductant, $$CO_2 + 2H_2 \rightarrow C + 2H_2O. \tag{9}$$

Similarly, the Sabatier process may be used to convert $CO_2$ into reduced carbon, again using hydrogen as a reductant, $$CO_2 + 4H_2 \rightarrow CH_4 + 2H_2O. \tag{10}$$

In some examples, the hydrogen input for any of the above processes may be electrolytically derived or captured from the discharge of a plasma/arc reactor, as noted hereinafter.

The term 'active metal' refers generically to metallic elements of groups IA and IIA of the Periodic Table of the Elements. In more particular examples, this term is restricted to relatively abundant and toxicologically and environmentally benign elements from groups IA and IIA—such as sodium, potassium, magnesium, and calcium. In some examples, accordingly, the oxide of the active metal includes CaO. In some examples, the oxide of the active metal includes sodium oxide ($Na_2O$). In some examples, the oxide of the active metal may include a mixture of oxides of different active metals.

As noted above, the reduced-carbon material in some examples may include waste plastic. Non-limiting examples of waste plastic include polypropylene (PP), polyethylene (PE), polystyrene, polyethylene terephthalate (PET), nylon, polyvinylchloride (PVC), acrylonitrile butadiene styrene (ABC), poly(methyl methacrylate) (PMMA), polycarbonate (PC), and polytetrafluoroethylene (PTFE). More generally, waste plastic may include any commonly used thermoplastic polymer or copolymer material or mixture thereof. In some examples, the thermoplastic polymer or copolymer material may be combined with thermosetting and/or cross-linked polymer materials and/or non-polymeric plasticizers. Alternatively or in addition, the reduced-carbon material may include non-plastic components, such as roof shingle and/or motor-vehicle tires.

The reduced-carbon material may be combined with the oxide of the active metal in any suitable manner. The reduced-carbon material may be conducted through a chipper and therein chipped to a desirable particle size distribution prior to combination with the oxide of the active metal, for instance. In other examples, the reduced-carbon material may be shredded or otherwise broken into fragments of suitable size. Active-metal oxide that is crushed, ground, and/or sieved to a suitable particle size may be combined with the fragmented reduced-carbon material at controlled proportions required for subsequent reaction of the feedstock.

In some examples, the reduced-carbon material may be heated to a melting or softening temperature before or during blending with the active metal oxide. The mixture of the reduced-carbon material and the active-metal oxide then may be extruded. In some examples, the extrusion process itself may release heat sufficient to soften the reduced-carbon material. By this or any other suitable encapsulation mechanism, the active-metal oxide is encapsulated in the reduced-carbon material, in the extruded material. Extrusions of feedstock comprising controlled proportions of blended reduced-carbon material and active-metal oxide may be cut or otherwise segmented to any desired length and stored until needed.

Storage of the active-metal oxide encapsulated in the reduced-carbon material admits of several advantages. First, encapsulation in reduced-carbon material may protect the active-metal oxide from ambient water vapor and carbon dioxide, especially if the reduced-carbon material is hydrophobic. The term 'hydrophobic' is applied herein to any material that is substantially water-repellant, water-insoluble and/or non-water-absorbing. Non-limiting examples of hydrophobic materials include waste plastic, roof shingle, and motor-vehicle tires. Without benefit of the encapsulation, exposure of an active-metal oxide to atmospheric constituents is liable to degrade the material to the corresponding hydroxide—e.g., $$CaO + H_2O \rightarrow Ca(OH)_2, \quad (11)$$

and/or carbonate, $$CaO + CO_2 \rightarrow CaCO_3. \quad (12)$$

Second, encapsulation enables the active-metal oxide to be stored in a more environmentally responsible manner, as stored, encapsulated oxide material is less likely than non-encapsulated oxide material to be washed into a waterway in the event of excessive rainfall or flooding.

Third, the encapsulated material can be stored with the desired proportion of the active-metal oxide to the reduced-carbon material 'locked in' for subsequent reaction. This feature is valuable because process 10 may be engineered to consume various different active-metal oxides and various different forms of reduced-carbon material, even in the same production run. However, the optimal proportion of active-metal oxide to reduced-carbon material may vary depending on the forms being combined. Therefore, storage of the constituents already blended at the correct proportion and encapsulated alleviates the need for precise, variable metering of the constituents as they enter the feedstock-reactor system (vide infra).

In process 10, the carbon content of the reduced-carbon material is extracted and incorporated into a usable product. Accordingly, the feedstock need not include any source of carbon apart from the reduced-carbon material itself. In some examples, however, the overall conversion efficiency of process 10 may be improved by addition of elemental carbon to the feedstock. More particularly, the feedstock may include elemental carbon formed as a by-product of formation of the cyanamide intermediate and subsequently separated from the product, as described further below. The elemental carbon may be included in the blending and extrusion operations noted above. In examples in which elemental carbon is included in the feedstock, the proportion of reduced-carbon material relative to active-metal oxide may be reduced to account for stoichiometric reaction of the elemental carbon with the active-metal oxide.

Subsequently in process 10, the feedstock is conveyed into a furnace for high-temperature processing. Generally speaking, the feedstock may be conveyed in any suitable form. The feedstock may be augured in solid form, for instance. Conveyance in softened solid, semisolid, and liquid forms is also envisaged. In some examples, the feedstock may be conveyed in the form of droplets or a continuous stream. At 14, accordingly, the feedstock is optionally re-melted with excess heat released in process 10, to facilitate conveyance into the furnace as a softened solid, semisolid, or liquid. The excess heat used to re-melt the feedstock may comprise heat recovered from cyanamide synthesis, from effluent-gas cooling, or from another point in the process (vide infra).

At 16 of process 10, the feedstock is heated in a furnace to yield an effluent gas entraining a carbide of the active metal. In a typical example, the feedstock is pre-heated in a chamber maintained at a relatively high pressure $P_1$. The feedstock may be heated to any temperature or range of temperatures suitable to pre-condition the feedstock for subsequent high-temperature heating. In one non-limiting example, the feedstock may be pre-heated to about 1300° C. The subsequent high-temperature heating may be enacted within an electric-arc furnace, although other furnace types are also envisaged. In some examples, an electric-arc furnace or other high-temperature heating stage may reach a temperature of about 2200° C. In examples in which the oxide of the active metal comprises calcium oxide, the reaction yields calcium carbide, $$CaO + 3C(\text{from reduced-carbon material}) \rightarrow CaC_2 + CO. \quad (13)$$

Other active-metal carbides, such as magnesium carbide, may be formed in the same manner.

Some reduced-carbon materials, such as waste plastics, include chlorinated and/or fluorinated polymers. Without tying this disclosure to any particular theory, it is believed that the halogen component of the feedstock will associate with the active metal under the aggressive thermal conditions of Eq 13, forming halide salts of the active metal—e.g., $CaCl_2$, $CaF_2$. This reaction pathway has been proposed in reported carbide synthesis using waste plastic in the feedstock. This provides at least the advantage of averting fluorinated and/or chlorinated hydrocarbon emission from the process. Moreover, $CaCl_2$ (and by inference $CaF_2$) is known to act as a flux for certain biphasic reactions—e.g., the reaction of $CaC_2$ with $N_2$, to form calcium cyanamide. Accordingly, the presence of a $CaCl_2$ and/or $CaF_2$ impurity in the $CaC_2$ may provide an additional advantage in scenarios in which the reduced-carbon material includes chlorinated and/or fluorinated waste plastic.

In examples in which the feedstock is heated in an electric-arc furnace, the furnace may be ignited from an initial cold state by initiating an arc discharge through the gas within the furnace. Once the electric-arc furnace is in operation, gas released by the decomposition of the reduced-carbon material and/or admitted as carrier gas (vide infra) will serve to sustain the arc. Such gas may include hydrogen, although various other arc-sustaining gasses are also envisaged. In some scenarios, accordingly, a portion of the effluent gas may be retained in the furnace to improve arc-heating efficiency.

In these and other examples, the feedstock may be heated under a flow of carrier gas admitted either to the furnace or fluidically upstream of the furnace. In examples in which a carrier gas is employed, the effluent gas that emerges from the furnace entraining the active-metal carbide includes the carrier gas. The carrier gas may be any gas that does not react with the active-metal oxide reactant or with the active-metal carbide intermediate at the operating temperatures of the furnace. In some examples, the carrier gas includes one or more of the inert gasses helium and argon. Alternatively or in addition, the carrier gas may include one or more of hydrogen and carbon dioxide, for instance.

In some examples, the rate of introduction of the carrier gas is controlled so as to influence the reaction kinetics of one or more stages of process 10. Such stages may include active-metal carbide formation at 16 and/or subsequent reaction of the active-metal carbide intermediate (vide infra). Generally speaking, increasing dilution with carrier gas reduces the rate of active-metal carbide formation because it cools the furnace. However, dilution may reduce the particle size distribution of the active-metal carbide intermediate, which increases the rate of the subsequent heterogeneous reaction of the intermediate.

At optional step 18, the effluent gas is subjected to a sieving operation, wherein the particles of the entrained active-metal carbide intermediate are size-selected upon discharge from the furnace. More particularly, only particles of sufficiently small size may be permitted to exit the furnace, thereby excluding highly agglomerated particles that may be less reactive toward cyanamide formation. In some examples, particles less than 100 microns, more preferably less than 20 microns, may be selected.

At 20 the effluent gas entraining the carbide of the active metal is cooled. More particularly, the effluent gas is cooled to a temperature suitable for subsequent transformation of the active-metal carbide into the corresponding active-metal cyanamide. In some examples, the effluent gas is cooled to about 1000° C. In some examples, cooling of the effluent gas may be effected by separating a portion of the flow of the effluent gas, actively or passively cooling that portion, and then re-introducing the cooled portion into the balance of the flow. The separated flow may be cooled by flowing through an air- or water-cooled chamber, for instance, or by flowing through an active heat exchanger.

Alternatively or in addition, the effluent gas entraining the active-metal carbide may be cooled via expansion. In particular, the effluent gas entraining the active-metal carbide may be discharged from the furnace into a chamber of pressure $P_2$, which is lower than $P_1$. Such cooling yields the carbide of the active metal in a controlled particle-size distribution. The reader will note that because the particle size distribution of the active-metal carbide is a function of the flow rate (vide supra), it is therefore also a function of the pressure differential $P_1 - P_2$.

Alternatively or in addition, the effluent gas entraining the active-metal carbide may be cooled by mixing with an endothermically decomposable gas. More particularly, an endothermically decomposable gas may be introduced into the flow of the effluent gas emerging from the furnace. Examples of suitable endothermically decomposable gasses include light hydrocarbons, such as methane, ethane, and propane, and mixtures thereof. At temperatures above 900° C., for example,

$$CH_4 \rightarrow C + 2H_2 \quad (14)$$

occurs spontaneously and absorbs significant heat. At lower temperatures, however, the reaction is non-spontaneous. Accordingly, introduction of one or more hydrocarbons, such as methane, is expected to cool the effluent gas entraining the active-metal carbide to temperatures appropriate for subsequent reaction, as described below.

At 22 nitrogen is introduced into the cooled effluent gas entraining the carbide of the active metal, to yield a cyanamide of the active metal and elemental carbon. In examples in which calcium carbide is entrained in the cooled effluent gas, the cyanamide product is calcium cyanamide,

$$CaC_2 + N_2 \rightarrow CaCN_2 + C. \quad (15)$$

Eq 15 represents the Franck-Caro process for conversion of calcium carbide to calcium cyanamide. Analogous reactivity is expected for active metals besides calcium, that form acetylide-type carbides under the conditions of Eq 13. An acetylide-type carbide is a carbide having a relatively short C—C bond length, which reacts spontaneously with water to form acetylene. Analogous reactivity may also be observed for active metals that form non-acetylide-type carbides, such as magnesium.

In some examples, nitrogen may be introduced to the effluent gas entraining the active-metal carbide in a fluidized-bed reactor, where the nitrogen and the effluent gas are passed through the granular active-metal carbide at a velocity high enough to suspend the solid in a pseudofluid state. In some examples, introducing nitrogen to the cooled effluent gas includes maintaining a positive (e.g., high-velocity) flow of the effluent gas to prevent backflow of the nitrogen into the furnace. This can be achieved by discharging the fluidized-bed reactor into a chamber of pressure $P_3$ that is lower than $P_2$. This strategy not only discourages the backflow of nitrogen into the furnace (which could result in the formation of an active-metal cyanide) but also enables additional cooling of the active metal cyananamide intermediate via further expansion of the effluent gas. In some examples, the gas at $P_3$ may cool by expansion to less than 900° C.

In some examples, the functionality of steps 18 through 22 may be achieved somewhat differently. For instance, the solid-particle output of the plasma reactor can be captured on a refractory substrate, permeable to gas, by applying a partial vacuum to the back of the substrate, thereby causing the gas carrying the particles to pass through the substrate and deposit the entrained particles on the substrate for further processing. The substrate can be maintained at a temperature optimal for further processing and be moved into a chamber for exposure to nitrogen gas, to form calcium cyanamide. this additional method should offer (an overall) very high nitrogen conversion efficiency with better control of this exothermic reaction.

At 24 the cyanamide of the active metal (M) is acidically hydrolyzed to yield a cyanamide compound and a salt of the active metal—e.g., $$M_nCN_2 + 2H^+ \rightarrow NH_2CN + nM^{(3-n)+}, \quad (16)$$

where $NH_2CN$ corresponds to the cyanamide monomer itself. In some examples, the cyanamide of the active metal may acidically hydrolyzed with water and carbon dioxide as the acid source. Under mildly basic conditions, cyanamide dimerizes into 2-cyanoguanidine, $$2NH_2CN \rightarrow (NH_2)_2(CN)_2, \quad (17)$$

which, if desired, is rearranged thermally to form the cyclic trimer melamine, $$(NH_2)_2(CN)_2 \rightarrow (NH_2)_3C_3N_3. \quad (18)$$

Accordingly, the cyanamide compound may include one or more of cyanamide monomer, 2-cyoganadine, and melamine. Cyanamide compounds are useful as nitrogen-rich fertilizers and as precursors for chemical synthesis, including pharmaceutical syntheses. Cyanamide compounds may also be used as fuels and as 'ammonia carriers'—i.e., storable, transportable substances that are controllably decomposable to yield ammonia. Over a vanadium pentoxide/zinc catalyst, for example, $$(NH_2)_2(CN)_2 + 4H_2O \rightarrow 2CO_2 + 4NH_3. \quad (19)$$

In examples in which calcium cyananamide is acidically hydrolyzed with water and carbon dioxide as the acid source, the by-product of the hydrolysis includes one or more of calcium carbonate and calcium bicarbonate as salts of the active metal—e.g., $$CaCN_2 + H_2O + CO_2 \rightarrow NH_2CN + CaCO_3, \quad (20)$$

depending on the pH. The term 'salt' refers herein to an ensemble of oppositely charged ions, whether arranged in solid form or dissociated in fluid solution. In that context, the reader will understand that bicarbonate ($HCO_3^-$) salts of some elements (e.g., sodium) are stable as solids and in solution, whereas $HCO_3^-$ salts of other elements (e.g., calcium) may be stable only in solution. Accordingly, 'calcium bicarbonate' refers herein to a dissolved material comprising $Ca^{2+}$ and $HCO_3^-$ in a 1:2 ratio.

The transformation in Eq 20 can be conducted in an aqueous slurry, from which the elemental carbon by-product of the cyanamide synthesis of Eq 15 may be separated. At 26 of process 10, accordingly, the elemental carbon by-product cyanamide synthesis is optionally separated from a product of hydrolysis of the calcium cyanamide. In some examples, the separated elemental carbon may be used in the feedstock, as noted hereinabove. In other examples, the separated elemental carbon may be combusted to generate heat for one or more stages of process 10.

Despite the advantages of separating the elemental carbon by-product, the elemental carbon alternatively may be used without separation from the hydrolysis products. For instance, unseparated elemental carbon and calcium carbonate and/or calcium bicarbonate may be dried and subjected to combustion conditions. In this manner, the one or more of the calcium carbonate and the calcium bicarbonate may be heated by combustion of the elemental carbon.

At 28 the salt of the active metal, which is a product of the hydrolysis, is heated to yield a recovered oxide of the active metal. For instance the one or more of the calcium carbonate and the calcium bicarbonate may be heated to yield recovered calcium oxide—e.g., $$CaCO_3 \rightarrow CaO + CO_2, \text{ or} \quad (21)$$

$$Ca(HCO_3)_2 \rightarrow CaO + H_2O + 2CO_2. \quad (22)$$

In some examples, the heating may be used to dry these salts prior to thermolysis. In some examples, accordingly, the active metal oxide used in 12 above may include an active metal oxide, such as calcium oxide, recovered in this manner. Recovery of CaO by thermolysis, as in Eqs 21 and 22, is less expensive and more environmentally sustainable than repeated thermolysis of natural limestone, which may release toxins such as mercury and/or arsenic. Furthermore, the carbon dioxide released in Eqs 21 and 22 may also be recaptured. Accordingly, in examples in which the acid hydrolysis at 24 employs carbon dioxide, the carbon dioxide may include recaptured carbon dioxide released by heating the one or more of the calcium carbonate and the calcium bicarbonate.

In some examples, the heat used to recover the oxide of the active metal may include reclaimed heat. Eq 15, for instance, is known to be a significantly exothermic reaction. Thus, the heat used to recover the oxide of the active metal may include heat reclaimed from introducing nitrogen to the cooled effluent gas entraining the active-metal carbide, such as calcium carbide. In other examples, the reclaimed heat may derive from the cooling of the effluent gas.

In other examples, heat used to recover the oxide of the active metal may derive from external combustion. In example in which the elemental carbon by-product is separated at 26, the elemental carbon may be combusted externally as a heat source for recovery of the oxide of the active metal. In other examples, the CO effluent gas can be combusted to yield such heat.

No aspect of the above process should be interpreted in a limiting sense, because numerous variations, extensions, and omissions are also envisaged. For example, as the effluent gas that carries the active-metal carbide intermediate includes CO (from Eq 13), process 10 may further comprise passing the effluent gas over a water-gas shift catalyst, to yield hydrogen, $$CO + H_2O \rightarrow CO_2 + H_2. \quad (23)$$

In variants in which an endothermically decomposable gas (e.g., methane) is used at 20 to effect cooling of the effluent gas, and wherein a portion of the endothermically decomposable gas is still present after formation of the active-metal cyanamide, that portion may be subject to cracking conditions prior to passing the effluent gas over the water-gas shift catalyst. In other words, high-temperature cracking enacted at 20, fluidically downstream of carbide formation, may be supplemented by additional low-temperature and/or catalytic cracking downstream of cyanamide formation, to yield additional hydrogen. Cracking may be supported by resistive heating of the effluent gas, for instance. In more particular examples, the fluidized carbon formed by such cracking may treated with high-temperature steam to yield carbon monoxide and hydrogen, $$C + H_2O \rightarrow CO + H_2. \quad (24)$$

fluidically upstream of the water-gas shift reaction.

The mode of utilization of the hydrogen prepared in Eqs 23 and 24 is not particularly limited. In some examples, the hydrogen may be included in the stream of carrier gas supplied at 16 of method 10. Incorporation of hydrogen into the carrier gas may be more desirable than incorporation of methane itself, which may contain impurities that introduce undesirable process variables. In other examples, the hydrogen may be converted to heat or electrical energy for carbide formation at 16 or elsewhere in process 10.

Furthermore, reclaimed heat or heat derived from combustion of the elemental-carbon by-product or any combustible component of the effluent gas, such as hydrogen, may be used not only to recover the oxide of the active metal, but, alternatively or in addition, to re-melt the feedstock at 14 of process 10.

Figure 4:
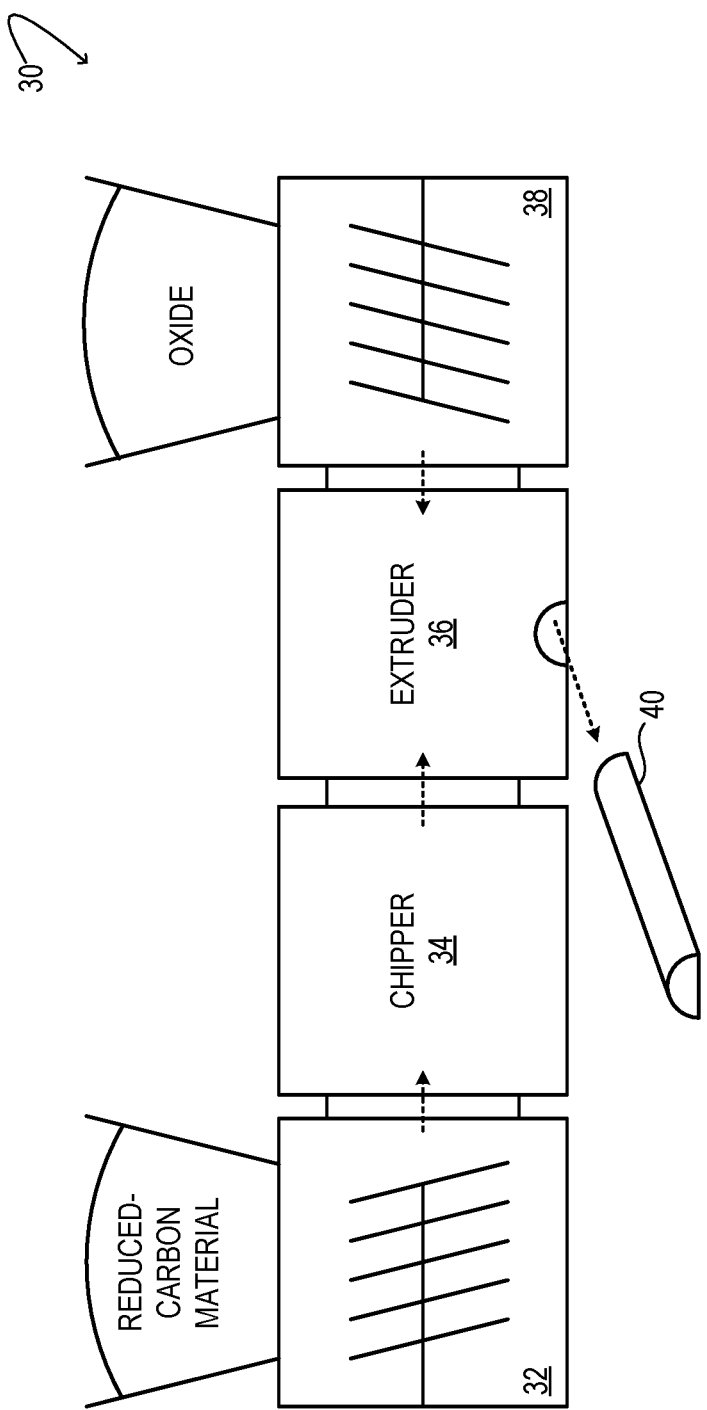
FIG. 4 shows aspects of an example feedstock-preparation system in connection to the process of FIG. 3.

FIG. 4 shows aspects of an example feedstock-preparation system 30 that may be used in connection to process 10. The feedstock-preparation system includes a hopper 32 and a chipper 34. The hopper is configured to receive reduced-carbon material and to convey the reduced-carbon material to the chipper. The chipper is configured to chip the reduced-carbon material into particles of a desired particle-size distribution.

Feedstock-preparation system 30 also includes an extruder 36 and an active-metal-oxide hopper 38. The extruder is configured to receive the chipped reduced-carbon material from chipper 34 and to receive active-metal oxide from the active-metal-oxide hopper. The extruder is configured to mechanically combine and intimately blend the chipped reduced-carbon material and the active metal oxide and to force the blended mixture through an orifice to form an extrusion 40 of active-metal oxide encapsulated in reduced-carbon material, which is suitable for use as a feedstock in process 10. In some examples, the extruder may be configured also to receive elemental carbon for incorporation into the feedstock.

Figure 5A:
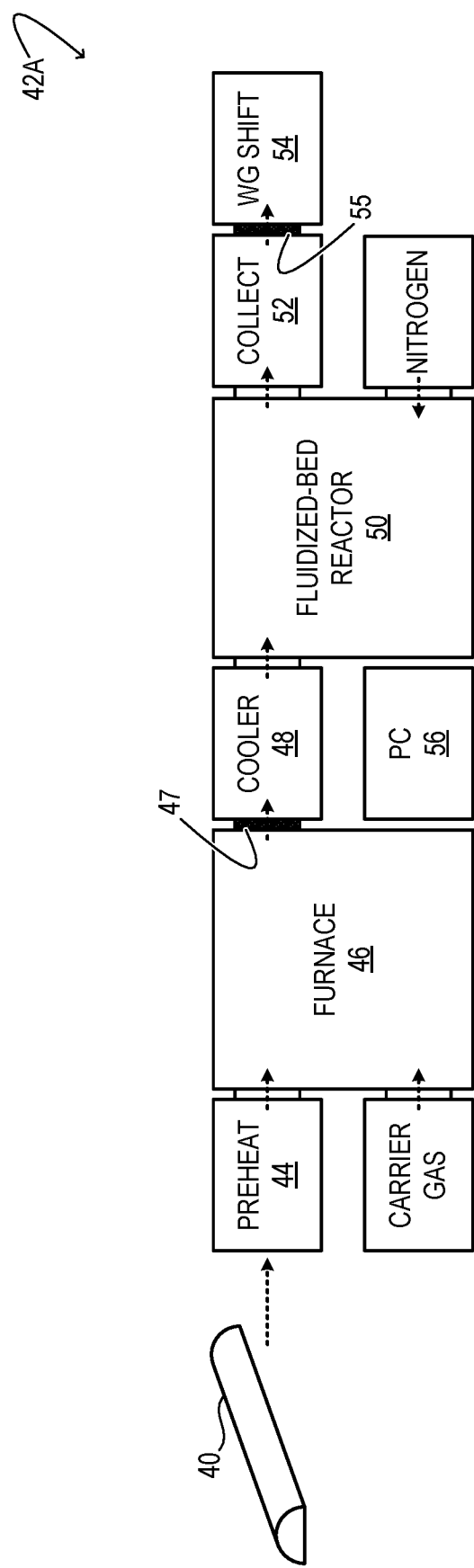
FIGS. 5A and 5B show aspects of example feedstock-reactor systems in connection to the process of FIG. 3.

FIG. 5A shows aspects of an example feedstock-reactor system 42A that may be used in connection to process 10. The feedstock-reactor system includes pre-heater 44 and a furnace 46. The pre-heater is configured to receive feedstock material and to pre-heat the feedstock material to a temperature suitable for entry into the furnace. The furnace is configured to receive pre-heated feedstock material from the pre-heater together with the carrier gas used in process 10. The furnace is configured to heat the pre-heated feedstock material and the carrier gas to a temperature at which Eq 13 occurs with favorable kinetics. In some examples, the furnace may comprise an electric-arc furnace. In more particular examples, the furnace may comprise a rotating arc and/or hollow-electrode electric-arc furnace. In the illustrated example, a size-exclusion sieve 47 is arranged fluidically downstream of the furnace.

Feedstock-reactor system 42A also includes an optional cooler 48 and fluidized-bed reactor 50. Furnace 46 is configured to discharge the effluent gas entraining the active-metal carbide to cooler 48. In some examples, the effluent gas may be discharged through a sieve that achieves size selection of the entrained particles of the active-metal carbide. The cooler is configured to cool the effluent gas entraining the active-metal carbide and to discharge the cooled effluent gas entraining the active metal carbide to the fluidized-bed reactor. In some examples, the cooler is configured to introduce an endothermically decomposable gas into the effluent gas flow. The fluidized-bed reactor is configured to receive the cooled effluent gas entraining the active-metal carbide, to receive also nitrogen, and to facilitate reaction of the nitrogen and the active-metal carbide to form fluidized active-metal cyanamide particles.

Feedstock-reactor system 42A also includes a collection chamber 52 and, optionally, a water-gas shift reactor 54. Fluidized-bed reactor 50 is configured to discharge the effluent gas entraining the active-metal cyanamide to the collection chamber. In the illustrated example, the collection chamber includes a filter 55 or other separation component configured to pass the effluent gas on to the water-gas shift reactor but to retain the active-metal cyanamide. The water-gas shift reactor is configured to convert the CO component of the effluent gas to $H_2$ (Eq 23). In some examples, optional cracking and/or producer-gas forming stages are arranged within or fluidically upstream of the water-gas shift reactor.

Feedstock-reactor system 42A also includes a process controller 56. The process controller is configured to receive sensory input from a plurality of sensors arranged in the feedstock-reactor system. Such sensors may include temperature sensors, pressure sensors, flow sensors, fill sensors, and the like. The sensors may be arranged on preheater 44, furnace 46, cooler 48, fluidized-bed reactor 50, collection chamber 52 and/or water-gas shift reactor 54, for example. The process controller is configured to provide control output to a plurality of actuators arranged in the feedstock-reactor system. Such actuators may include flow actuators that control the flow of carrier gas and/or nitrogen, or the flow between fluidically connected components of the feedstock-reactor system. Other actuators may include heating actuators for preheater 44, furnace 46, fluidized-bed reactor 50, and/or water-gas shift reactor 54, and cooling actuators for cooler 48, for example. Process controller 56 includes a computer system configured to execute a process for controlling any, some, or all of the control outputs based on any, some, or all of the sensory inputs, and further based on desirable process setpoints and/or input from a human operator. In some examples, the process controller may be configured to control any, some, or all of the control outputs in a closed-loop manner, based on any, some, or all of the sensory inputs and/or process setpoints.

Figure 5B:
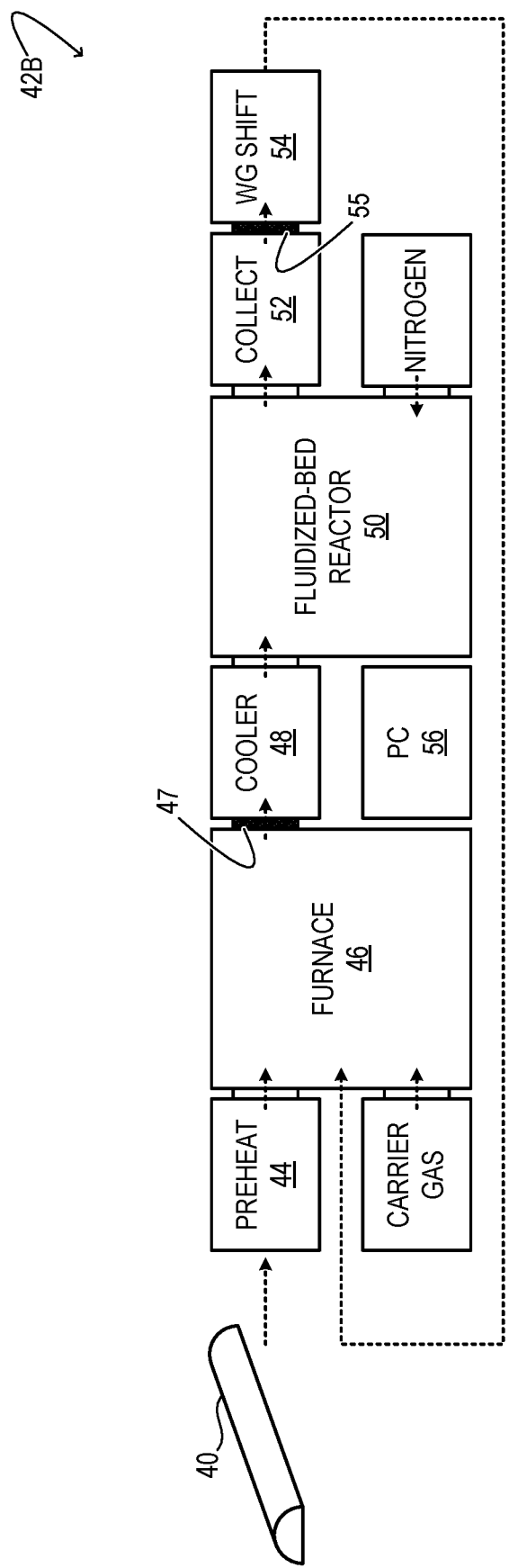

FIG. 5B shows aspects of another example feedstock-reactor system 42B that may be used in connection to process 10. In feedstock-reactor system 42B, a portion of the discharge from water-gas shift reactor 54 is fed back to furnace 46 to supplement the carrier gas admitted to the furnace. That portion may include hydrogen formed in the water-gas shift reactor and/or any non-reactive gas transmitted through the water-gas shift reactor.

Figure 6:
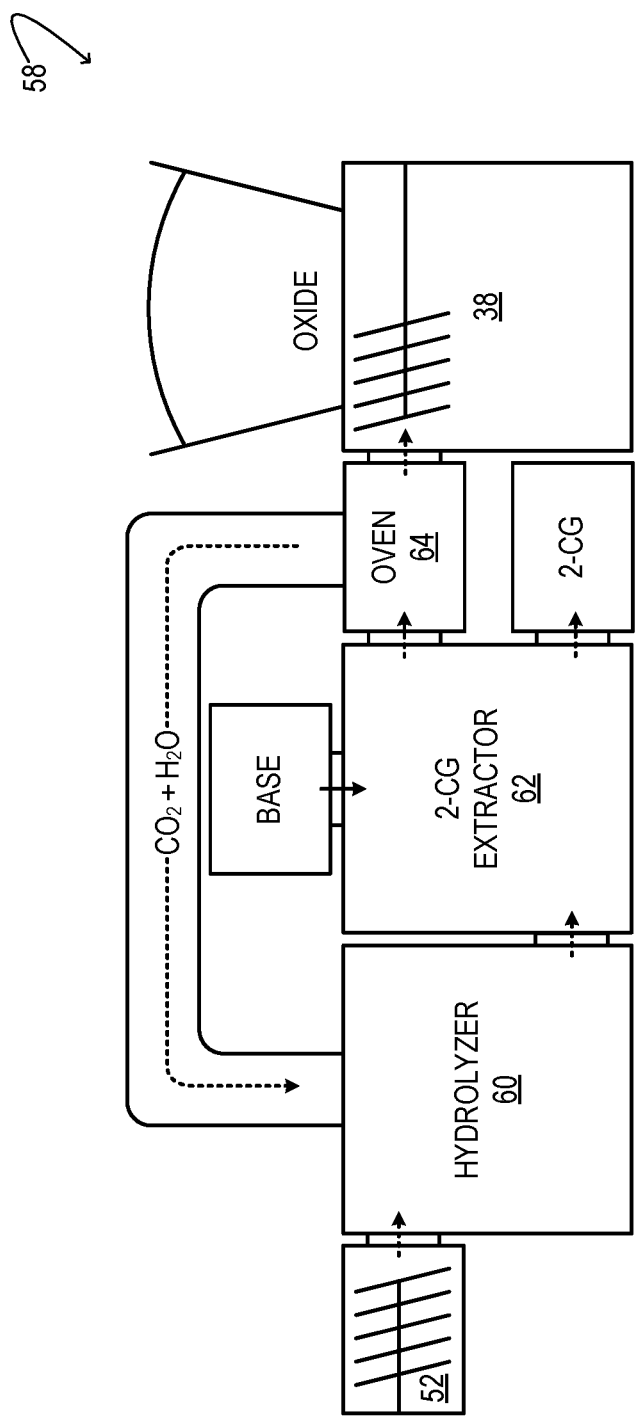
FIG. 6 shows aspects of an example cyanamide-reactor system in connection to the process of FIG. 3.

FIG. 6 shows aspects of an example cyanamide-reactor system 58 that may be used in connection to process 10. The cyanamide-reactor system includes hydrolyzer 60 and 2-cyanoguanadine (2-CG) extractor 62. The hydrolyzer is configured to receive the active-metal cyanamide from collection chamber 52 and to receive also an equimolar mixture of water and $CO_2$. The hydrolyzer is configured to facilitate acidic hydrolysis of the active-metal cyanamide and to release the hydrolysate to the 2-CG extractor. To that end, the 2-CG extractor is configured to receive a base (as understood in the context of acid-base chemistry) and to combine the hydrolysate and the base, causing the cyanamide component of the hydrolysate to dimerize into 2-CG.

Cyanamide-reactor system 58 also includes oven 64. From 2-CG extractor 62, a carbonate and/or bicarbonate component of the hydrolysate is conveyed to the oven, which is configured to heat the carbonate and/or bicarbonate component to a temperature at which the thermolysis of Eqs 21 and 22 is spontaneous. Gaseous products of the thermolysis, water vapor and $CO_2$ are conveyed back to hydrolyzer 60, while the active-metal oxide component is conveyed to active-metal-oxide hopper 38.

No aspect of the process componentry should be understood in a limiting sense, because other forms of componentry may be used, alternatively or in addition, in connection to the processes, functions, and acts disclosed herein. For instance, while the disclosure above emphasizes ACH as a substitute for anhydrous ammonia, it also may be be used as a replacement for ammonium nitrate ($NH_4NO_3$) as well as $NH_4NO_3$-urea fertilizers (called UAN). Those fertilizers, in solid form, can be hazardous to store. Moreover, UAN can be hazardous to pump under some conditions. Nevertheless, aqueous ACH solutions may also be used as a medium for delivery of certain other types of fertilizers—e.g., water-soluble K- or P-type fertilizers, which may be co-dissolved in the ACH solutions.

While the disclosure above emphasizes the application of aqueous ACH solutions to soil from a pressurized source, it is also possible to completely hydrolyze the 2-CG into ammonia and carbon dioxide within the reactor, and dispense an aerosol containing these gasses into the soil, in lieu of the ACH solution. Such aerosol may form a 'cone' of fixed nitrogen in the soil in which it is bladed.

Other practical benefits derive from the ability to drive 2-CG hydrolysis to completion, yielding ammonia and carbon dioxide. For example, ammonia is a high-energy fuel suitable for use in an internal combustion engine, such as the engine of the farm equipment used to dispense the ACH solution (or fertilizer aerosol). Thus, a portion of the hydrolysis product can be dispensed into the soil, and another portion can be used as fuel for the engine that provides motive force for the dispensing. That operational scenario can be facilitated by a hydrolyzer supporting adjustable hydrolysis conditions—e.g., by controllable regulation of pressure, temperature, and/or 2-CG solution flow rate.

It will be understood that the configurations and/or approaches described herein are exemplary in nature, and that these specific examples are not to be considered in a limiting sense, because numerous variations are possible. The specific routines or methods described herein may represent one or more of any number of processing strategies. As such, various acts illustrated and/or described may be conducted in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The following additional documents are also hereby incorporated herein by reference for all purposes:

R. K. Graupner and J. D. Hultine, PRODUCTION AND USE OF CYANOGUANIDINE AND CYANAMIDE, International Patent Application Publication Number WO 2012/123378 A1, 20 Sep. 2012.

R. K. Graupner and J. D. Hultine, PRODUCTION AND USE OF CYANOGUANIDINE AND CYANAMIDE, International Patent Application Publication Number WO 2012/123380 A2, 20 Sep. 2012.

The invention claimed is:

1. Farm equipment configured for fertilizer application, the equipment comprising:
a tank configured to store an aqueous solution of a cyanamide compound;
a hydrolyzer including an upstream segment configured to receive and heat the aqueous solution, thereby forming an aqueous cyanamide hydrolysate (ACH), and a downstream segment configured to cool the ACH under pressure,
wherein the equipment is configured to release the cooled ACH, comprising both nitrogen and carbon, to soil.

2. The equipment of claim 1 wherein the upstream segment is further configured to receive heat drawn from the equipment.

3. The equipment of claim 1 wherein the upstream segment includes a catalyst configured to accelerate hydrolysis of the cyanamide compound.

4. The equipment of claim 1 wherein the hydrolyzer comprises a coil, and the upstream segment is a segment of the coil.

5. The equipment of claim 1 wherein the hydrolyzer comprises a coil, and the downstream segment is a segment of the coil.

6. The equipment of claim 1 wherein the downstream segment is further configured for forced-air cooling.

7. The equipment of claim 1 further comprising an exit valve arranged fluidically downstream of the downstream segment and configured to maintain the pressure and to controllably release the ACH.

8. The equipment of claim 1 further comprising an engine, wherein the upstream segment is further configured to receive heat from the engine.

9. The equipment of claim 8 wherein the engine is a standing engine and/or an irrigation engine.

10. The equipment of claim 8 wherein the engine provides mechanical power to drive the equipment from place to place.

* * * * *